United States Patent [19]

Olschewski

[11] 4,142,075
[45] Feb. 27, 1979

[54] INTERFACE CIRCUIT AND METHOD FOR TELEPHONE EXTENSION LINES

[75] Inventor: Wilfred W. Olschewski, Tucson, Ariz.

[73] Assignee: Burr-Brown Research Corporation, Tucson, Ariz.

[21] Appl. No.: 841,009

[22] Filed: Oct. 11, 1977

[51] Int. Cl.² .................. H04B 1/58; H04Q 1/28
[52] U.S. Cl. .............. 179/170 NC; 179/16 F
[58] Field of Search ............... 179/16 F, 16 A, 18 F, 179/18 FA, 170 NC, 81 R, 81 B

[56] References Cited

U.S. PATENT DOCUMENTS

| 4,001,859 | 1/1977 | Miyoshi et al. | 357/19 |
| 4,037,065 | 7/1977 | Nahay | 179/170 NC |
| 4,039,766 | 8/1977 | Picandet | 179/170 NC |
| 4,041,252 | 8/1977 | Cowden | 179/170 NC |
| 4,056,691 | 11/1977 | Freimanis et al. | 179/18 FA |

*Primary Examiner*—Thomas A. Robinson
*Attorney, Agent, or Firm*—Cahill, Sutton & Thomas

[57] ABSTRACT

A semiconductor interface circuit and method of operation for transmitting and receiving information between a telephone set and a four wire switching system. The interface circuit includes DC current sources which may be modulated by a voice signal from the switching system. The current sources provide both DC power and the voice signal to the telephone set through a two wire cable. A high impedance amplifier amplifies the signal on the cable, which cable signal includes a DC voltage, a microphone signal from the telephone set, and a component due to the voice signal from the switching system, all three being dependent on the cable length. Cable termination resistors are optional. The signal from the switching system and the DC component of the output signal of the amplifier are multiplied by an inverting multiplier circuit. The output signal of the multiplier circuit is proportional to cable length and is utilized to cancel the amplifier output signal component which is related to the voice signal from the switching system. Thus, echo return is eliminated or minimized regardless of cable length. Differential optical coupling circuits are utilized to couple the signal from the switching system to the cable and to couple the cable signal to the switching system relatively independently of the efficiency of the light emitting diodes of the differential optical coupling circuits. A DC ring insertion signal is coupled from the switching system to an output of the interface circuit via one of the differential optical coupling circuits. Status signals from the telephone set are conducted via another of the differential optical coupling circuits. The semiconductor interface circuit is housed in a package having two optically isolated cavities therein.

21 Claims, 6 Drawing Figures

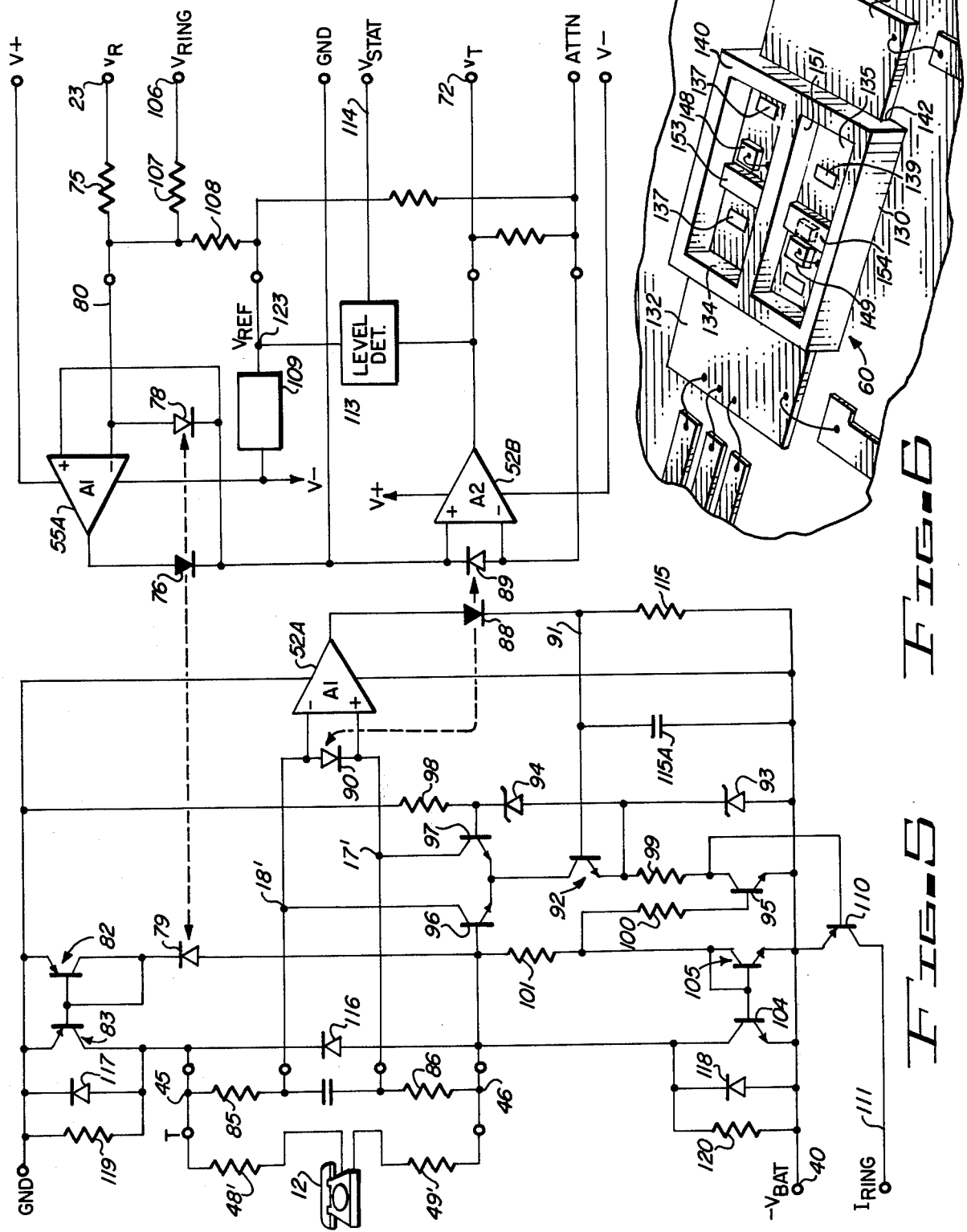

INTERFACE CIRCUIT AND METHOD FOR TELEPHONE EXTENSION LINES

BACKGROUND OF THE INVENTION

1. Field of the Invention

The invention relates to telephone extension line circuitry and techniques for conversion of bi-directional signals on a two wire cable to uni-direction signals for a four wire switching system.

2. Description of the Prior Art

Interface circuits, commonly referred to as "hybrids," are required for connecting conventional telephone sets to telephone extension lines from electronic switching systems such as Private Automatic Branch Exchange (PABX) systems or Telephone Central Office (Level 5) switching circuit systems. The important functions and elements of extension-line circuits include the following. First, high voltage protection devices capable of transferring voice signals to and from the four wire switching system are required to protect the electronic switching system (i.e., the PABX). The two bi-directional signals on the two wire telephone cable must be separated by means of a two-to-four wire converter. A powering circuit is required to feed DC power to the telephone set. The DC feed circuit must be protected against short circuits to the two wire cable. Ring insertion circuitry is required which activates the ringing device in the telephone set when a ring command is sent from the electronic switching system. Finally, a means of status detection is required for indicating changes in the status of the telephone set, such as on-hook and off-hook transitions, etc.

Both the bulk and the cost of electronic switching systems have been greatly reduced as a consequence of the rapid progress in large-scale integrated circuit technology in recent years. However, no significant size reductions have been made in the interface circuits or hybrids which are utilized to connect conventional telephone sets to the improved electronic switching systems. This is because up to now no suitable circuitry has been available to implement the interface circuits without using costly and bulky transformers to achieve high-voltage protection of the electronic switching systems from static discharge surges which are frequently induced on the two wire cable. Transformers simply do not permit high packaging density. The cost of these interface circuits has not been significantly reduced because a number of the functions they must provide, such as high-voltage protection and DC feeding of the two wire telephone cable to power the conventional set, are not compatible with modern integrated circuit technology.

A new approach is needed to overcome the above drawbacks to provide stable, low cost, accurate, transformerless high voltage protected signal transmission and to provide status and ring insertion signaling paths to interface conventional telephones with modern four wire telephone switching systems.

Extension-line circuits must provide a variety of functions to enable connection of conventional telephone sets to digital electronic switching systems using pulse code modulation and time division multiplexing. The necessary analog-to-digital and digital-to-analog conversion in such digital electronic switching systems requires a uni-directional four wire signal system, whereas conventional telephone extension lines require a two wire bi-directional signal system.

Although the hybrid transformer has provided suitable high voltage protection for interface circuits in the past, its bulkiness in relation to modern large scale integrated circuits makes the transformer the limiting component with respect to further size and cost reductions of electronic switching systems. It has been suggested that high voltage isolation problems be approached utilizing optical couplers. However, the emission efficiency of presently available light emitting diodes in optical couplers varies considerably more as a function of time than is acceptable in telephone interface circuits.

Previous interface circuits require isolated high voltage protected DC paths for the signaling functions, including hook status detection, dial pulse detection, and ring insertion control. These functions have been accomplished utilizing expensive relays. These components require additional expense. Electro-mechanical devices such as the previously used relays are inherently much less reliable than modern integrated circuit devices which are used elsewhere in recently developed systems. The transformers and relays are now the limiting factor in size, cost, and reliability of conventional telephone interface circuits.

The conventional resistive DC feed systems of conventional interface circuits utilize two 400 ohm resistors, one coupled between ground and a primary winding of a hybrid transformer and the other connected between a $-48$ volt battery power source and the other primary winding of the isolation transformer. The cable resistances of each wire of the two wire cable, which may vary between 0 and 500 ohms, is in series with the respective 400 ohm resistors and the 200 ohm resistance of the telephone set when the receiver is off the hook. Consequently, the current fed by the 400 ohm resistors and the battery power source to the telephone set may vary between 24 milliamps and 48 milliamps. Thus, the power consumption may vary by a factor of approximately two and the voltage drop on the usual 200 ohm DC resistance of the telephone set may also vary by a factor of two.

In conventional telephone interface circuits the voice signal from the telephone set is terminated with a 600 ohm impedance. Consequently, the microphone output voltage signal transmitted to the electronic switching system varies as a function of the length (and resistance) of the two wire cable because of voltage division of the microphone output signal between the cable resistance and the 600 ohm termination resistor.

It has been suggested to use modulated current sources to provide the DC feed to the two wire cable and to reproduce the incoming voice signal to provide the signal to be received by the earphone of the telephone set. However, the suggested system utilizes a 600 ohm cable termination, causing attenuation of the microphone output signal as a function of cable length. The previously suggested system uses optical couplers whose signal transmission characteristics are directly proportional to the light emission efficiency of the light emitting diodes therein. These systems are incapable of operating within the required tolerance for telephone extension systems because of the inherent instability of presently available light emitting diodes.

An extension line interface circuit requires low echo return, which occurs when any part of the voice signal received from the electronic switching system is fed back to that four wire electronic switching system as a component of the microphone output transmitted to the electronic switching system. Both the microphone output signal and the voice signal received from the four wire switching system may appear simultaneously on the two wire cable. The component due to the voice signal received from the four wire switching system must be cancelled out before the microphone output signal is transmitted to the four wire switching system. Any part of that component not cancelled out is referred to as "echo return." If a significant echo return is present in the system, the user of the telephone set will hear his own voice louder than normal, and his transmitted voice level will be reduced. In addition, there is a strong possibility that the system will break into oscillation at a particular frequency, causing "singing" which will make that extension line inoperative.

Conventional two-to-four wire converter circuits provide minimum echo return only if they are terminated with the nominal line impedance of 600 ohms. However, variation of line impedance due to cable length is so severe that the echo return signal may be as little as 10 dB below the transmitted signal at either extreme of the line impedance value. Strapping may then be required to maintain the required 14 dB level of the echo return signal below the transmitted signal. This involves additional components and cost.

Ordinarily, expensive high voltage relays are utilized to isolate the interface circuit from the two wire cable to allow a ring voltage to be impressed upon the ringing circuit of the telephone set in response to a ring command from the four wire switching system. The voltage applied to the ringing circuitry is ordinarily approximately 90 volts RMS at 20 $H_z$ and may reach 120 volts in magnitude, so that the high voltage relays are necessary to prevent the ringing signal from damaging the interface circuit. Static discharges on the line which would arc across the relays must be kept out of the switching circuits.

Prior methods of fabricating semiconductor devices utilizing optical couplers and integrated circuits which are operatively connected together usually involves the use of separate packages for two separate integrated circuit chips and use of a special package in which light emitting diodes and photodiodes are housed together to provide optical coupling. Consequently, the packaging and interconnection costs for integrated electronic circuits which utilize optical couplers are substantially higher than for integrated circuits which do not use optical couplers.

SUMMARY OF THE INVENTION

Accordingly, it is an object of the invention to provide a telephone interface circuit of reduced size and reduced cost for interfacing between a standard telephone set in an electronic switching system.

Another object of the invention is to provide a telephone interface circuit which does not require the use of transformers for high voltage isolation.

Another object of the invention is to provide a telephone interface circuit which reduces power dissipation of the telephone system.

Another object of the invention is to provide an interface circuit utilizing optical couplers which have improved stability and which transmit signals independently of the emission efficiency of light emitting diodes of the optical couplers.

Another object of the invention is to provide a telephone interface system having improved accuracy of transmitted voice signals.

Another object of the invention is to provide a telephone interface system wherein the echo return is minimized.

Another object of the invention is to provide a telephone interface system having simplified, reduced cost ring insertion circuitry and status and detection circuitry which is implemented without utilizing relays.

Briefly described, the invention is a semiconductor interface circuit and method of operation for transmitting and receiving information between a telephone set and a switching system. The interface circuit includes current sources for providing DC power to the telephone set through a two wire cable. The current sources are modulated by an audio signal received from the four wire switching system. A high impedance amplifier is connected to the two wire cable for providing an output signal which has a DC component and an AC component both of which are functions of the cable resistance, and therefore of the cable length. In one embodiment of the invention no termination devices are coupled between two wires of the cable at the interface circuit end of the cable. The audio signal received from the switching system and the output signal of the amplifier provide inputs to an inverting analog multiplier. The output of the analog multiplier circuit represents a signal equal to the complement of the signal from the switching system multiplied by a factor which is proportional to the cable resistance. The output of the amplifier circuit includes a component derived from the audio signal which is received from the switching system and has an amplitude proportional to the cable length. The output of the amplifier also includes a component related to the microphone output signal from the telephone set and relatively independent of the cable length. The output of the multiplier circuit and the output of the amplifier are coupled to a summing node of an operational amplifier so that the component of the audio signal from the switching system is cancelled at the summing node. Differential optical coupling circuits are utilized to couple the audio signal from the switching system to modulate the current sources and also to couple the microphone signal voltage to the four wire switching system. The differential optical coupling circuits are independent of the efficiency of the light emitting diodes therein and therefore have stable transfer functions. A DC ring insertion control signal from the switching system is coupled from the four wire switching system to an output of the interface circuit through one of the differential optical couplers to turn off the current sources, isolating the rest of the interface circuit from the cable. DC status signals from the telephone set are conducted through the other differential optical coupling circuit to the switching system. The semiconductor interface circuit is housed in a package having two optically isolated cavitives therein. The semiconductor interface circuit is implemented on two semiconductor integrated circuit chips each having a portion extending into both of the cavities. Within each cavity, a light emitting diode of one of the differential optical coupling circuits is physically and electrically mounted on a semiconductor chip. The corresponding photodiodes of the respective differential optical coupling circuits are fabricated on portions of the semiconductor chips within the respective cavities.

BRIEF DESCRIPTION OF THE DRAWINGS

FIG. 5 is a schematic diagram of an embodiment of the invention.

FIG. 6 is a perspective drawing of a semiconductor package for housing the interface circuit of the invention.

DESCRIPTION OF THE INVENTION

Interface circuits, also called hybrids, are utilized to connect the two wire cable from the standard telephone sets to a PABX or to a Telephone Central Office switching system. Extension line interface circuits must provide a variety of functions which are required if a conventional telephone set is connected to a digital electronic switching system using pulse code modulation and time division multiplexing.

Figure 1:
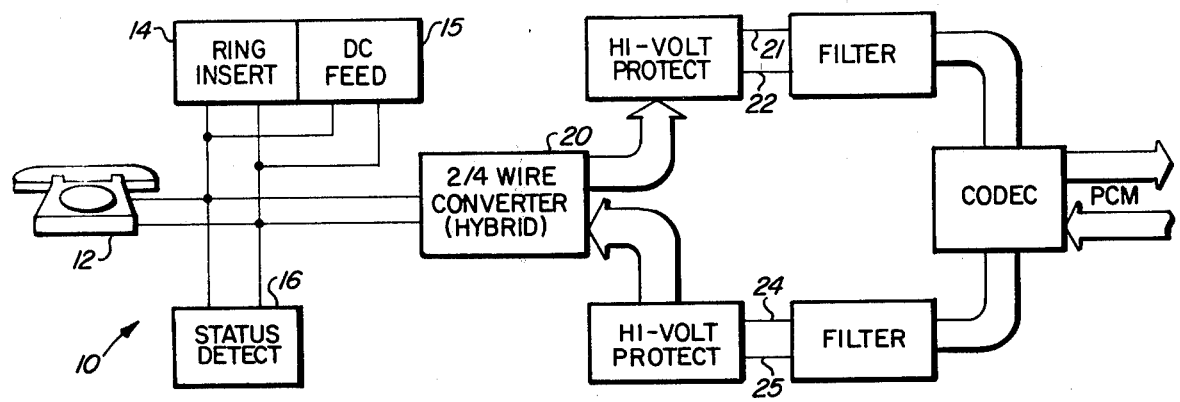
FIG. 1 is a functional block diagram of an extension line circuit.

FIG. 1 is a block diagram which shows the basic elements of a telephone extension line system which is interfaced to a four wire switching system. As previously mentioned, the basic functions and elements of an extension line circuit include high voltage protection devices, two-to-four wire conversion, providing DC power to the telephone set, ring insertion, and status detection. This invention relates to implementation of these elements and function.

Figure 2:
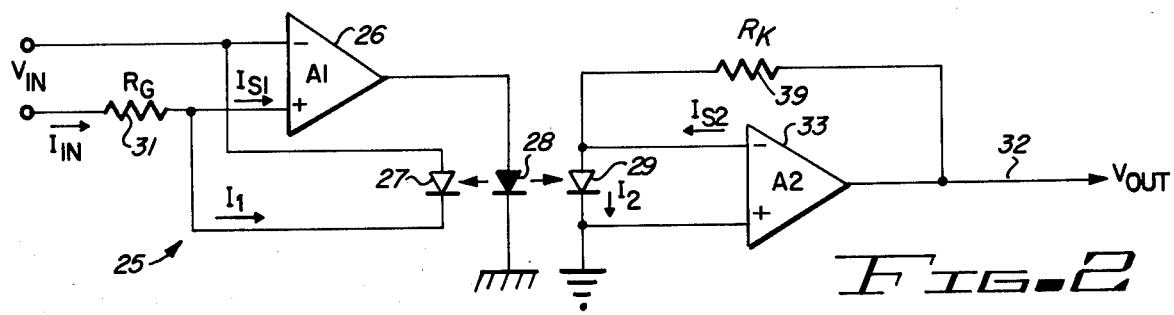
FIG. 2 is a simplified schematic diagram of a differential optical coupling system which is utilized in the circuits of FIGS. 4 and 5.

Before describing the preferred embodiments of the invention, it is helpful to explain the concept of differential optical coupling. The basic differential optical coupling system of FIG. 2 permits replacement of the costly, bulky transformers presently used in two-to-four wire converters. The differential optical coupler of FIG. 2 provides an output voltage $V_{out}$ which is a replica of the input voltage $V_{in}$. However, $V_{out}$ is completely isolated from $V_{in}$, so that a large voltage surge induced on the inputs of operational amplifier 26 will not cause damage to circuitry connected to node 32.

The operation of the differential optical coupler is as follows. Light emitting diode 28 is driven by operational amplifier 26. Photodiodes 27 and 29 are matched photodiodes which are positioned to receive equal amounts of light emitted by light emitting diode 28. Photodiode 27 is utilized to close a feedback loop around operational amplifier 26 such that operational amplifier 26 drives increasing amounts of current through light emitting diode 28 until $I_{in} = I_1$. $I_{S1}$ is very nearly equal to zero since the operational amplifier 26 has nearly infinite input impedance.

Photodiode 29 is utilized to feed a current equal to the current through photodiode 27 to operational amplifier 33, which in conjunction with feedback resistor 39 functions as a current-to-voltage converter. The output voltage $V_{out}$ rises or falls unitl $I_2$, the current through photodiode 29, equals the current through feedback resistor 39, so that $I_{S2}$ is equal to zero, at which point $V_{out}$ is stabilized. It may be readily determined that the transfer function of the differential optical coupler of FIG. 2 is given by the equation $$V_{out} = (R_k/R_g) V_{in}.$$

Since this above equation does not contain a term proportional to the light emission efficiency of light emitting diode 28, the stability of light emitting diode 28 is not critical to the signal transmission characteristics of the differential optical coupler of FIG. 2. The quantum efficiency of photodiodes 27 and 29 is determinative of the overall stability of the differential optical coupler, but the photodiodes are manufactured utilizing silicon technology and have quantum efficiency characteristics which, in the present state of the art, are several orders of magnitude more stable than the efficiency of light emitting diodes, which are presently manufactured using gallium arsenide technology.

It should be noted that the differential optical coupling concept of FIG. 2 is not only utilized to replace the transformer function of providing high voltage isolation protection and high common mode rejection for the voice signal transmission, but may also be utilized to provide an isolated high voltage protected DC path for the telephone signaling functions, including hook status, dial pulse detection, and ring insertion control, as explained hereinafter.

Figure 3:
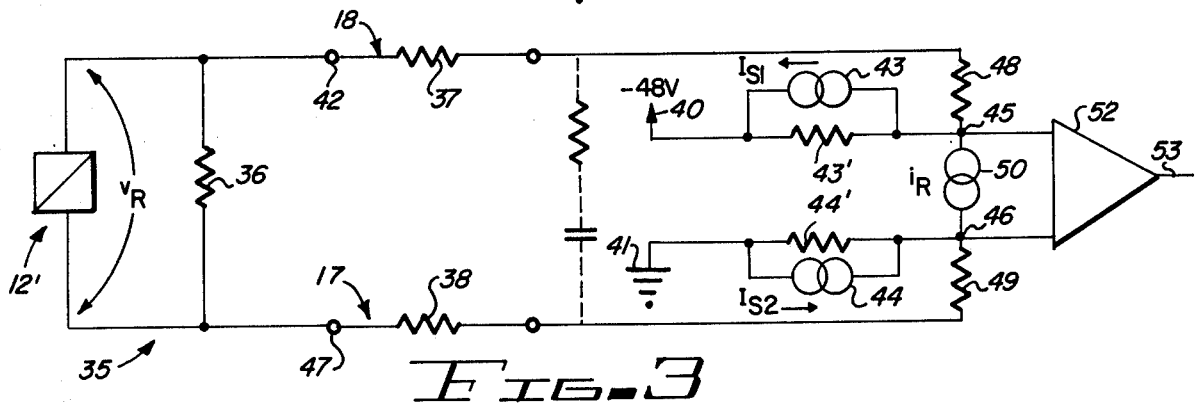
FIG. 3 is a simplified schematic diagram of the DC line feed system and voice sensing system of the invention.

FIG. 3 illustrates the basic concept of electronic implementation of the DC feed function to power the telephone set. Current sources 43 and 44, each having an output impedance of several Kilohms, represented by resistors 43' and 44', respectively, provide a constant DC component of current through cable wires 18 and 19, respectively, to provide power to telephone set 12'. Reference numeral 12' actually represents the earpiece and the microphone of the telephone set. The microphone and the earpiece are interconnected and have a combined DC resistance of approximately 200 ohms, represented by resistor 36. Current source 43 is connected to a −48 volt power supply connected to terminal 40, while current source 44 is connected to ground conductor 41. Resistors 48 and 49, which couple current sources 43 and 44 to wires 18 and 19, respectively, are power resistors which protect the electronics coupled to nodes 45 and 46 from surge voltages and ringing voltages induced on or applied to lines 18 and 19. The cable resistances are represented by resistors 37 and 38, and may vary from 0 to 500 ohms, since the maximum permitted cable resistance in telephone extension lines is 1000 ohms.

Use of current sources to provide a constant DC current component to the telephone set provides a stable DC voltage to the telephone set across nodes 42 and 47. This results in uniformly low power dissipation both in the telephone set and in the DC feed circuitry. The previously mentioned large effect of variations in cable resistance on the DC voltage and on power dissipation at the telephone set is thereby avoided.

FIG. 3 also illustrates an equivalent circuit which shows how the voice signal received from the four wire switching system is fed into the two wire cable 18, 19. This function is accomplished by means of an equivalent AC current source 50, which is connected between nodes 45 and 46. In contrast, the usual approach is to feed the voice signal from a 600 ohm voice signal source in the four wire switching system into the primary of a transformer having a secondary winding coupled between nodes 45 and 46.

Utilization of equivalent current source 50 to provide an AC voice current signal $i_R$ into the two wire cable 18, 19 eliminates current variation due to variations in the cable resistance 37 and 38. Thus, a uniform and stable voltage signal is received at the telephone set regardless of cable length. The value of the current $i_R$ should be set such that it produces the same signal strength at the earpiece as is produced by the conventional transformer audio feed system. A value of $i_R = 1.29$ milliamps (RMS) corresponds to a signal level of 0dBm in the conventional 600 ohm system.

FIG. 3 also illustrates an improved electronic implementation of the function of sensing the voice signal generated by the microphone of the conventional telephone set 12'. A high impedance differential amplifier 52 has its inputs connected to nodes 45 and 46. It is ordinarily desirable that differential amplifier 52 perform a high voltage protection function, so that circuitry connected to output 53 will not be damaged by surges which may occur on two wire cable 18, 19. Use of high input impedance amplifier 52 permits elimination of the usual 600 ohm termination resistance used in conventional transformer systems. As a result, a significant improvement in the variation in the microphone output signal between nodes 45 and 46 is achieved. The improvement occurs because there is no voltage division between the cable resistance and the eliminated 600 ohm termination resistance. Consequently, the influence of cable length and associated cable resistance (shown by resistors 37 and 38) is eliminated. The effects of eliminating the 600 ohm transmission line termination are relatively insignificant for cable lengths up to several miles, since the wave length of highest frequency signal, 3.4 kilohertz, in the pass band in 53 miles. The cross-talk expressed in dB below the voice signal will remain unchanged because both voice and pickup levels will increase equally on long cables. If desired, however, a 600 ohm termination may be connected between nodes 45 and 46. The system will then function like the usual terminated systems.

Figure 4:
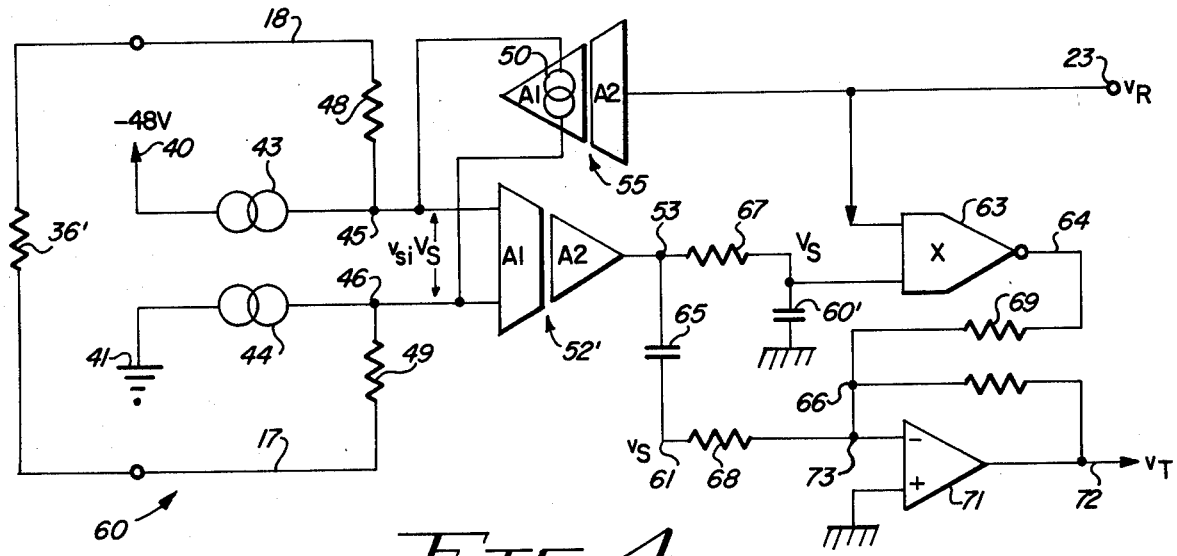
FIG. 4 is a simplified block diagram of an interface circuit according to an embodiment of the invention.

The invention provides greatly improved echo return characteristics over known interface circuits. A simplified equivalent circuit diagram of the features of the invention which provide for minimum echo return are shown in FIG. 4. In the circuit of FIG. 4, compensation for echo return is based on cable length, i.e., on the value of cable resistances represented by resistors 37 and 38 in FIG. 3. In FIG. 4, the cable resistances 37 and 38 and the resistance of the telephone set 36 are all lumped together and represented by resistor 36'. Resistors 48 and 49 in FIG. 4 are the surge protection resistors also shown in FIG. 3 by the same reference numerals. In FIG. 4 the microphone signal voice sensing amplifier is implemented by using a differential optical coupler 52', which is implemented according to the concept illustrated in FIG. 2 and explained above. FIG. 4 also illustrates in more detail the manner in which the signal $v_R$ received from the four wire switching system is converted to provide the received audio feed signal $i_R$ represented by current source 50 in FIG. 3. (It should be understood that, in accordance with common usage, the term "signal" as used herein and in the claims may refer to either the information represented by an electrical voltage or an electrical current, or to the electrical voltage or electrical current itself.)

Actually, FIG. 3 merely represents an equivalent circuit viewpoint; the actual implementation is more clearly depicted in FIG. 4 by a second optical coupler 55 having its input connected to node 23, to which signal $v_R$, which is the voice signal received from the four wire switching system, is applied. The second stage amplifier A2 of differential optical coupler 55 is actually a current-to-current amplifier and performs the function of generating current source 50 which sends the received voice signal in the form of current $i_R$ to the telephone set over two wire cable 18, 19. (As will be explained subsequently with respect to FIG. 5, the function of current source 50 is actually achieved by modulating the DC feed current sources 43 and 44 to provide the desired received voice current on two wire cable 18, 19.)

It should be noted that in FIG. 4 the two wire cable 17, 18 provides bi-directional signal flow. The signal $v_R$ received from the four wire switching system is converted to a current which is sent through two wire cable 17, 18, to the earphone of the telephone set. The voice signal generated by the microphone of the telephone set is transmitted along wires 17 and 18, where it is sensed by amplifier 52'. The echo return is minimized by cancelling out any component of $v_R$ on the cable. The voice signal $v_T$ is transmitted by means of conductor 72 to the four wire switching system. The signals on conductors 23 and 72 are uni-directional. The system is referred to as a "four wire" system because the conventional system utilizes a hybrid transformer, having two wires per signal path. The ground conductors are not shown in FIG. 4, but it is to be understood that the circuitry of FIG. 4 incorporates the two-to-four wire converter, with the two wires which are grounded being implied to be present.

The operation of the equivalent circuit of FIG. 4 to minimize the echo return signal, i.e., the feed through of $v_R$ through differential optical coupler 55, differential optical coupler 52' and the remaining circuitry to conductor 72, is as follows. The DC feed voltage $V_S$ between nodes 45 and 46 is amplified by differential optical coupler 52', as explained above with respect to FIG. 2. Since the impedance of analog multiplier circuit 63 is high, and since differential optical coupler circuit 52' is designed to have unity gain, and since it operates both as an AC amplifier and a DC amplifier, a voltage equal to $V_S$ appears on node 60. Conductor 23 is connected to the other input of analog multiplier 63, so the magnitude of the voltage appearing at the output thereof is equal to the product of $v_R$ and $V_S$, except that it is inverted with respect to $v_R$ and is therefore 180 degrees out of phase with $v_R$. The magnitude of $V_S$ is clearly proportional to the cable resistance represented by resistors 37 and 38 in FIG. 3, since the DC currents $I_{S1}$ and $I_{S2}$ are constant. Therefore, the out-of-phase signal at node 64 is multiplied by a factor which directly reflects the cable length, or cable resistance, to the telephone set. (It is understood that, in accordance with common usage, the term "amplifying" as used herein and in the claims may mean amplification by a gain factor of unity or more or less than unity, and may also mean producing of an output quantity of a different kind than the input quantity. For example an amplifier which produces a change in output current in resonse to an increase in input voltage, or vice versa, is said to "amplify" the signal represented by the input voltage; etc.)

Capacitor 60' and resistor 67 filter the voice signal components of the cable voltage out of the cable signal to produce a DC signal at node 66. However, the AC components of the signal at node 53 are coupled directly to node 61 by means of capacitor 65, while the DC component is blocked by capacitor 65. Resistors 68 and 69 are selected so that the component of $v_R$ between nodes 45 and 46, which is reproduced at node 53, is coupled to node 61, and finally is cancelled out at node 73 by the signal produced at analog multiplier output 64. Since the inverted signal produced at node 64 has been obtained by multiplying $v_R$ at node 23 by a DC voltage which varies with cable resistance in exactly the same way that the component of $v_R$ at node 61 varies with cable resistance, the cancellation at summing node 73 is precise over a wide range of cable lengths. Consequently, the voice signal $v_T$ transmitted on conductor 72 represents only the microphone output signal from the telephone set 12. The echo return has been effectively eliminated or at least minimized.

In short, the circuitry of FIG. 4 accomplishes the objective of cancelling out any portion of the AC signal voltage on the two wire cable 18, 19 that is due to $v_R$ before it gets to node 72, so that there is no feedback from node 23 to node 72, or that for all practical purposes the amount of such feedback is minimized over a wide range of cable lengths.

A more detailed implementation of the interface circuit of the invention is shown in FIG. 5. Referring now to FIG. 5, the audio signal $v_R$ received on conductor 23 from the four wire switching system is transmitted by means of input gain resistor 75 to node 80, which is connected as an input of operational amplifier 55A. Operational amplifier 55A, light emitting diode 76, diodes 78 and 79, and the circuitry including current mirror transistors 82 and 105 and current source transistors 83 and 104 form a differential optical coupling system similar to the one shown in FIG. 2. However, the second amplifier A2 of FIG. 2 is implemented in FIG. 5 as a current-to-current converter rather than as a current-to-voltage converter in this embodiment of the invention.

The current flowing through light emitting diode 76 has both a DC component and an AC component. The DC component is determined by a DC bias current flowing into node 80 from voltage reference circuit 109, which may be implemented in a number of ways, such as by use of common zener diode reference voltage circuits. Resistor 108 controls the DC biasing current generated from node 123 by reference circuit 109 to node 80, thereby controlling the DC component of the output voltage of operational amplifier 55A, and thereby also controlling the DC component of the current through light emitting diode 76. The light emitted by light emitting diode 76 activates photodiodes 78 and 79, causing them to produce a DC current. Photodiode 78 closes the loop around operational amplifier 55A, as explained previously with respect to FIG. 2, and stabilizes the DC component of the output voltage of operational amplifier 55A and thereby also stabilizes the current through photodiode 79.

The current through photodiode 79 flows through current mirror transistors 82 and 105, thereby establishing proportional DC current components in transistors 83 and 104, respectively. The collectors of transistors 83 and 104 are respectively coupled to nodes 45 and 46. (Nodes 45 and 46 correspond to the nodes having the same reference numerals in FIGS. 3 and 4.) Examplary values of the currents through transistors 83 and 104 are 20 to 24 milliamps. This results in a voltage difference between nodes 45 and 46 of four to twenty-four volts, depending on whether the total cable resistance total is very close to zero for a short cable or is very near 1000 ohms for a maximum length cable. The above DC voltage difference is symmetrically centered about $-24$ volts, which is the midrange point for the usual $-48$ volt power source utilized in telephone systems.

A portion of the voice signal $v_R$ applied to node 80 is controlled by input gain setting resistor 75. In response to the AC voltage component on node 80, operational amplifier 55A modulates the voltage at its output and thereby modulates the previously established DC current through light emitting diode 76, which in turn modulates the current through photodiode 79. Consequently, the modulated currents through current mirrors 82 and 105 cause modulation of the current in the two wire cable 17, 19 in accordance with the received voice signal $v_R$. A corresponding variation in the voltage between nodes 45 and 46 occurs.

Thus, it is seen that the AC current in the two wire cable generated by current source 50 in FIGS. 3 and 4 is implemented in the circuit of FIG. 5 by modulation of the DC currents through the DC current sources 43 and 44, which correspond to transistors 83 and 104 in FIG. 5.

The audio voltage at nodes 18' and 17' includes both the voice signal generated by the microphone of telephone set 12 and the component due to $v_R$ caused by the modulation of the currents through transistors 83 and 104. This audio voltage is applied to the inputs of operational amplifier 52A.

Operational amplifiers 52A and 52B, light emitting diode 88 and photodiodes 89 and 90 form a second differential optical coupler. Operational amplifier 52A causes a current having a DC component representative of the DC voltage difference between nodes 45 and 46 and AC components representative of both the microphone output voltage and $v_R$ to flow through light emitting diode 88. The magnitude of the current is controlled by the output of operational amplifier 52A. Photodiode 90 absorbs the current supplied through resistors 85 and 86 and closes the feedback loop around operational amplifier 52A, as explained previously with respect to FIG. 2 to stabilize the current through light emitting diode 88. An equal amount of current flows through light emitting diode 89, which drives amplifier 52B to produce the output voltage $v_T$, which represents the voice signal generated by the microphone of telephone set 12. $v_T$ is then transmitted to the four wire switching system via conductor 72.

The echo return is minimized by means of circuitry including zener diodes 93 and 94, and the differential amplifier including transistors 96 and 97. Transistors 96 and 97 inject a cancellation current into photodiode 90. The cancellation current cancels the portion of the AC signal between nodes 45 and 46 due to $v_R$. The operation of the cancellation circuitry is analogous to the operation of the cancellation circuitry in FIG. 4, but its implementation in FIG. 5 is considerably different. The operation of the cancellation circuitry of FIG. 5 is as follows.

The current through light emitting diode 88 is proportional to both the AC and DC components of the voltage difference between nodes 45 and 46. The DC current through light emitting diode 88 is sensed by resistor 115, and is proportional to the cable length, i.e., to the cable resistance, of conductors 17 and 18 (and also the resistances at resistors 48' and 49'). The voltage across resistor 115 is therefore directly proportional to the DC voltage difference between conductors 17 and 18. The voltage across resistor 115 is then utilized to control the base of transistor 92, which operates as a current source for the differential amplifier which includes transistors 96 and 97. Therefore, the greater the cable resistance, i.e., the longer the cable, the greater the common mode current that flows through the differential amplifier.

One side of the differential amplifier is biased by a fixed voltage established by the sum of the voltage drops across zener diodes 93 and 94. The voltage applied to the other side of the differential amplifier, to the base of transistor 96, is developed across resistor 101 by the current through photodiode 79, which, as previously explained, controls the DC and AC components of voltage on cable 17, 18, in response to both the reference voltage supplied by circuit 109 and to the received signal $v_R$. The values of the various resistors, including resistors 101, 99, and 115 and the geometries of the various transistors may be selected so that transistors 96 and 97 operate to cancel the component of voltage due to $v_R$ between nodes 45 and 46, thereby minimizing or eliminating the echo return. The differential amplifier including transistors 96 and 97 plays the same role in the circuit of FIG. 5 that multiplier 63 plays in the circuit of FIG. 4. The gain characteristics ($g_m$) of differential amplifier transistors 96 and 97 are controlled by the current through current source transistor 92 and thus by the DC voltage difference between nodes 45 and 46, and therefore by the cable length.

The operation of the differential amplifier is that transistor 92 modulates the $g_m$ of transistors 96 and 97 such that the output voltage of operational amplifier 52A causes the correct amount of DC current to flow through light emitting diode 88, so that the voltage drop produced across resistor 115 is equal to $V_{Z2}$ plus the base-emitter voltage of transistor 92. This is accomplished with very small variations in DC current through light emitting diode 88, since very slight changes in base to emitter voltage produce the required change in collector current. This stabilizes the differential output current of differential amplifier 96, 97 at a level proportional to the cable length. Any increase in the component of AC voltage between nodes 45 and 46 due to increased cable length is accompanied by an increase in gain ($g_m$) of transistors 96 and 97. Thus transistors 96 and 97 modulate their collector currents into nodes 17 and 18 proportionally to their gains ($g_m$), thereby cancelling the AC component due to $v_R$ from the cable 45, 46. Thus, the only AC voltage that gets transmitted via photodiode 89, operational amplifier 52B and conductor 72 to the four wire switching system is $v_T$, the microphone output signal. The echo return of $v_R$ is eliminated regardless of cable length. Thus, with the proper scaling the above circuitry provides cancellation of the AC voltage across conductors 17 and 18 due to the AC current injected by transistors 83 and 104 in response to $v_R$. Capacitor 115A by-passes AC components to prevent the $g_m$ of transistors 96 and 97 from responding to AC signals.

Resistors 119 and 120 are provided to compensate for differences in the current in transistors 83 and 104 and to compensate for leakage currents between cable conductors 17, 18 and for externally induced imbalances in order to maintain a common mode or lateral line voltage of approximately 24 volts.

Any transient voltages on the line exceeding ground volts or −48 volts ($-V_{BAT}$) are absorbed by external protection resistors 48' and 49' and are clipped by protection diodes 117 and 118. Diode 116 prevents polarity reversal between conductors 17 and 18.

The ring command in telephone extension systems ordinarily causes an AC voltage of 20 Hz with magnitudes of the order of 90 volts to be impressed upon the cable 17, 18 to cause the telephone set to ring. In the circuit of FIG. 5, the ring command is supplied to input conductor 106 of the interface circuits. The voltage $V_{RING}$ and resistor 107 cause a current greater than and opposite to the bias current provided by resistor 108 to be injected into node 80. (The voltage applied to conductor 106 could be a $T^2L$ logic gate output.) This voltage causes operational amplifier 55A to turn off, thereby turning off light emitting diode 76, and causing photodiode 79 to turn off. This in turn causes current source transistors 83 and 104 to be turned off and effectively disconnects cable 17, 18 from the ground and −48 volt conductors. The absence of current through photodiode 79 also causes transistor 95 to be turned off. This causes transistor 110 to be turned on by the current through resistor 99. The collector of transistor 110 may then be utilized to energize a triac or an ordinary inexpensive low voltage relay which is connected to cause the telephone set to ring.

The status signaling function is performed as follows. It is necessary for the four terminal switching system to know whether the phone is on the hook. When the telephone receiver is "on the hook," the telephone set appears as an open circuit to cable conductors 17 and 18, and no signal current flows therein. It may be seen that if conductors 18 and 17 appear as an open circuit to the interface circuit of FIG. 5, the current through current source transistors 83 and 104 increases the DC voltage difference between nodes 45 and 46, which causes amplifier 52A to saturate. This greatly increases the current through light emitting diode 88, which in turn causes a large amount of current to flow through photodiode 89, thereby saturating operational amplifier 52B. This produces a high voltage at the output of operational amplifier 52B, which high voltage is detected by level detector circuit 113. (Level detector circuit 113 may be implemented in a variety of ways, for example, by a Schmidt trigger.) Level detecting circuit 113 produces a suitable output voltage on status output conductor 114, which voltage indicates the status of the telephone set. Dial pulses from the telephone set are processed entirely similarly and can also be sensed at status output conductor 114.

The interface circuit 60 of FIGS. 4 and 5 is implemented on two semiconductor chips 131 and 132, as shown in FIG. 6. The two chips are inserted into opposite ends of a package member 130 having two optically isolated compartments 134 and 135. The two compartments are optically isolated by means of a lid, not shown, and a member 151 which separates the two compartments, and by the chips themselves. The photodiodes are produced on the two semiconductor chips 131 and 132 along with other integrated circuitry of the interface circuit. The photodiodes are located so that they both appear in the same optically isolated compartment of the package as the light emitting diode which activates them. The galium arsenide light emitting diodes are physically attached to a portion of one of the two chips extending into subject optically isolated compartment. For example, light emitting diode 148 is mounted on silicon semiconductor chip 131 within compartment 134, and the two corresponding photodiodes indicated generally by 137 are located in semiconductor chips 131 and 132, respectively, and are equally spaced from light emitting diode 148. Separating members 153 and 154 are provided within the two optically isolated cavities to prevent the substrates of the two semiconductor chips from touching and thereby being electrically shorted. Both the package body 130 and the semiconductor chips which are inserted through accommodating openings such as 142 therein, may be mounted on a ceramic substrate 144. The light emitting diodes may be both die bonded and wire bonded within the respective optically isolated compartments to appropriate portions of the semiconductor chips to provide the necessary electrical paths indicated in the circuits of FIGS. 4 and 5. Each semiconductor chip may then be wire bonded to metal conductors or lead frame members such as 145 on the ceramic substrate. Ceramic substrate 144 may be the substrate of a dual-in-line package or other suitable package. The optically isolated cavities may be filled with a transparent epoxy resin or other suitable substance. The lid and the ceramic should, of course, be opaque.

A number of alternate variations on the circuitry shown in the drawings are possible. For example, non-optical couplers which have the desired degree of miniaturization might eventually be utilized, although none are at the present time commercially feasible. Although the drawings and description suggest use of differential optical coupling techniques, non-differential couplers might be satisfactory if the light emitting diodes thereof could be obtained with stable light emission efficiency. Presently, however, galium arsenide light emitting diodes do not have sufficient stability to make this approach feasible. Although photodiodes are utilized in the invention as described above, other photosensitive devices, such as phototransistors or photoresistors might readily be utilized if such devices could be integrated at a sufficiently low cost and with sufficient stability of perimeters and with sufficiently high quantum efficiency.

Variations on the packaging scheme are also possible. For example, the entire interface circuit except for the light emitting diodes might be provided on one chip. Members 153 and 154 would then be eliminated. Or, the photodiodes and the light emitting diodes of a particular differential optical coupler might be provided on the same chip. In that case, the chips would be inserted so that each chip would extend into only one of the optically isolated compartments, rather than both of them. As another alternative, the light emitting diodes could be mounted on the members 153 or 154 instead of on the integrated circuit chips, as indicated by the light emitting diode drawn with dotted lines in FIG. 6.

In summary, the foregoing disclosure includes an interface circuit suitable for use in telephone extension systems. The interface circuit provides a transformerless device. This greatly decreases both the size and the cost of the interface circuit. The invention provides modulated current sources to produce both the required DC voltage difference on the two wire telephone extension cable and also the AC voice signal received from the four wire switching system on the two wire cable without the utilization of a 600 ohm source for the received audio signal from the four wire switching system. This approach eliminates major variations in both the DC and AC voltages at the telephone set due to cable resistance variations and also results in uniformly low power dissipation, irrespective of cable length and cable resistance. This approach also eliminates variation of the component of the cable voltage due to the received voice signal $v_R$. The 600 ohm cable termination utilized by present systems may be eliminated by the invention. This eliminates the voltage drop of the microphone output voltage between the cable resistance and the termination resistance. The influence of cable length on voice transmission attenuation is therefore substantially reduced. Utilization of differential optical coupling techniques provides stable voice transmission in both directions.

The use of the differential optical coupling approach permits coupling of both AC and DC signals. The invention provides a new technique for minimizing echo return by providing circuitry which produces a cancellation voltage proportional to cable resistance in order to cancel out portions of the AC cable signals due to the voice signal received from the four wire switching system. It should be noted that the cancellation of AC cable signals due to the voice signal received from the four wire switching signal may be accomplished by circuitry which directly subtracts a cancellation signal which is in phase with the AC voice signal from the four wire switching system. The term "subtraction" as used in this regard is intended to include both direct subtraction of an in-phase signal or summing of an out of phase signal with respect to the AC voice signal from the four wire switching system. Inconvenient and expensive balancing techniques which have to be tailored for telephone extensions having different cable lengths are thereby avoided. The disclosed technique permits transmission of the ring insertion command via voice signal paths of the interface circuit. Further, the AC voice paths used for transmission of signals from the microphone to the four wire switching system may also be utilized to signal the status of the telephone hook and to detect dialing information without the use of additional circuitry and conductors. Finally, the packaging concept disclosed eliminates the necessity for providing expensive separate packages for the differential optical couplers.

I claim:

1. An interface circuit for transmitting telephone signals between an electronic switching system and a two wire cable connected to a telephone set, said telephone set having a telephone set resistance coupled across the two wires of said two wire cable, said two wire cable having a cable resistance, said telephone set producing a microphone voltage signal transmitted along said two wire cable, said electronic switching system producing an audio frequency signal, said interface circuit comprising in combination:

(a) means for producing a substantially constant DC reference current;

(b) current source means connected to said two wire cable for producing a substantially constant DC current component in said two wire cable in response to said DC reference current and an AC current component in said two wire cable in response to said audio frequency signal, said AC current component producing a corresponding AC voltage component between the two wires of said two wire cable;

(c) amplifying means coupled to said two wire cable for amplifying said microphone voltage signal, said amplifying means having a sufficiently high input impedance to prevent substantial reduction of the said microphone voltage signal due to voltage division of said microphone voltage signal across said input impedance, said cable resistance, and said telephone set resistance; and (d) there being no termination resistance substantially reducing said microphone voltage signal and said AC voltage component due to voltage division of said microphone voltage signal and said AC voltage component across said telephone set resistance, said cable resistance, and said termination resistance;

whereby, said AC voltage component and said microphone voltage signal are substantially independent of the distance between the points of said two wire cable to which said amplifying means and said telephone set are respectively coupled.

2. The interface circuit of claim 1 further comprising differential optical coupling means responsive to the audio frequency signal and to said DC reference current means for producing said reference current to control said current source means.

3. The interface circuit of claim 2 wherein said current source means includes a first current source for producing a first current flowing into one wire of the two wire cable and a second current source for producing a second current flowing out of the other wire of the two wire cable, wherein the first and second currents are each substantially equal to the sum of said DC current component and said AC current component.

4. The interface circuit of claim 3 wherein said first current source includes a PNP transistor for producing said first current and having its collector coupled to the one wire and its emitter coupled to a voltage supply conductor, and wherein said second current source includes an NPN transistor for producing said second current and having its collector coupled to the other wire and its emitter coupled to another voltage supply conductor.

5. The interface circuit of claim 4 further including a first current mirror circuit responsive to said DC reference current and incorporating said PNP transistor for providing base current for said PNP transistor, and further including a second current mirror circuit responsive to said DC reference current and incorporating said NPN transistor for providing base current for said NPN transistor.

6. The interface circuit of claim 2 wherein said differential optical coupling means comprises:
  (a) first amplifying means for producing an output current in response to both said audio frequency signal and said DC reference current;
  (b) light emitting diode means for emitting light in response to said output current;
  (c) first photosensitive means for providing a negative feedback signal to an input of said first amplifying means in response to said light; and
  (d) second photosensitive means for producing said reference current in response to said DC light.

7. The interface circuit of claim 1 wherein said amplifying means includes differential optical coupling means coupled to said two wire cable for amplifying said microphone voltage signal and for providing high voltage isolation between said two wire cable and said electronic switching system.

8. The interface circuit of claim 7 further comprising second differential optical coupling means coupled to said electronic switching system and said current source means for receiving said audio frequency signal from said electronic switching system and producing said AC current component, whereby said AC current component represents said audio frequency signal and is detected by an earphone of said telephone set.

9. The interface circuit of claim 8 further comprising:
  (a) means for inducing a first DC reference current into said second differential optical coupling means, wherein said second differential optical coupling means produces a second DC current in response to said first DC reference current, and wherein said DC current component produces a DC voltage between the two wires of said two wire cable proportional to said distance of said two wire cable;
  (b) means coupled to said second differential optical coupling means for producing a cancellation signal proportional to said audio frequency signal and said distance of said two wire cable in response to said DC voltage across said two wire cable produced by said DC current component; and
  (c) means connected to said cancellation means for subtracting said cancellation signal from said audio frequency signal on said two wire cable such that substantially no component of or due to said audio frequency signal from said electronic switching system is included with said microphone voltage signal transmitted to said electronic switching system by said interface circuit.

10. The interface circuit of claim 8 further comprising:
  (a) means for inducing a first DC reference current into said second differential optical coupling means, wherein said second differential coupling means produces a second DC current in response to said first DC reference current, and wherein said DC current component produces a DC voltage between the two wires of said two wire cable dependent on the length of said two wire cable;
  (b) means coupled to said second differential optical coupling means for producing a cancellation signal which is out of phase with said audio frequency signal and proportional to said distance of said two wire cable in response to said DC current component and to the audio frequency signal; and
  (c) means connected to said cancellation means for summing said cancellation signal and said audio frequency signal on said two wire cable to cancel said audio frequency signal such that substantially no component of or due to said audio frequency signal from said electronic switching system is included with said microphone voltage signal transmitted to said electronic switching system by said interface circuit.

11. An interface circuit for transmitting telephone signals between an electronic switching system and a two wire cable connected to a telephone set, the interface circuit comprising in combination:
  (a) means for producing a DC reference current;
  (b) differential optical coupling means responsive to said DC reference current means and to the electronic switching system for producing a current representative of an audio frequency signal received from the electronic switching system and also representative of the DC reference current; and
  (c) current source means responsive to said differential optical coupling means and coupled to the wire cable for producing both a DC current component and an AC current component in the two wire cable, the DC current component being determined by the DC reference current and the AC current component being determined by the audio frequency signal.

12. An interface circuit for coupling a two wire cable connected to a telephone set to an electronic switching system, the interface circuit comprising in combination:

(a) means for producing a first AC signal on the two wire cable proportional to the length of the two wire cable in response to a first signal transmitted to the interface circuit by the electronic switching system;

(b) means for producing a DC voltage on the two wire cable proportional to the length of the two wire cable;

(c) means for receiving a microphone signal from the telephone set on the two wire cable;

(d) means responsive to the first signal coupled to the two wire cable for producing an AC cancellation signal proportional to the DC voltage;

(e) means responsive to said cancellation means for subtracting the cancellation signal from the first AC signal, and the microphone signal, thereby effecting cancellation of the first AC signal from the two wire cable and producing a signal which includes the microphone signal, but is substantially free of any components due to the first signal; and (f) means responsive to said summing means for transmitting the microphone signal to the electronic switching system, wherein the echo return loss of the first signal is maximized.

13. An interface circuit for coupling a two wire cable connected to a telephone set to an electronic switching system, the interface circuit comprising in combination:

(a) means for producing a first AC signal on the two wire cable proportional to the length of the two wire cable in response to a first signal transmitted to the interface circuit by the electronic switching system;

(b) means for producing a DC voltage on the two wire cable proportional to the length of the two wire cable;

(c) means for receiving a microphone signal from the telephone set on the two wire cable;

(d) means responsive to the first signal coupled to the two wire cable for producing an AC cancellation signal proportional to the DC voltage, the cancellation signal being out of phase with the first AC signal;

(e) means responsive to said cancellation means for summing the cancellation signal, the first AC signal, and the microphone signal, thereby effecting cancellation of the first AC signal from the two wire cable and producing a signal which includes the microphone signal, but is substantially free of any components due to the first signal; and (f) means responsive to said summing means for transmitting the microphone signal to the electronic switching system, wherein the echo return loss of the first signal is maximized.

14. The interface circuit of claim 13 wherein said AC cancellation signal producing means includes differential amplifier means responsive to said DC voltage producing means and said AC signal producing means for producing said AC cancellation signal.

15. The interface circuit of claim 14 wherein said differential amplifier means includes first and second transistors having their emitters connected together, and the base of the first transistor being responsive to the first AC signal, and wherein the summing means couples the collectors of the transistors to the respective summing input of said amplifier.

16. The interface circuit of claim 15 wherein said differential amplifier means includes current source means coupled to the emitters of said first and second transistors and to the output of said first amplifier for controlling the voltage-to-current gain of said first and second transistors in response to the DC voltage component of the output voltage of said first amplifier, whereby the magnitude of the differential current signal is proportional to the DC voltage on the two wire cable and is hence proportional to cable length.

17. An interface circuit for coupling a two wire cable connected to telephone set to an electronic switching system, the interface circuit comprising in combination:

(a) differential optical coupling amplifier means having an input responsive to the electronic switching means for producing isolated AC and DC voltages or currents at an output of said differential optical coupling amplifier in response to AC and DC voltages at the input;

(b) means for coupling a ring command voltage from the electronic switching system to the input of said differential optical coupling amplifier, causing the output voltage or currents of the differential optical coupling amplifier to undergo a transition to a limiting voltage level;

(c) current source means responsive to said differential optical coupling amplifier for producing a DC feed current component and an AC current component in the two wire cable when the ring command voltage is absent; and (d) output means responsive to the transition to the limiting voltage level for producing a current for activating ring insertion circuits for the telephone set.

18. An interface circuit for coupling a two wire cable connected to a telephone set to an electronic switching system, the interface circuit comprising in combination:

(a) differential optical coupling amplifier means having differential inputs responsive to a steady or pulsed open circuit condition presented to the two wire cable by the telephone set for producing steady or pulsed voltages at a high-voltage-isolated output in response to the voltage produced on the two wire conductor by the open circuit conditions;

(b) current source means producing a DC feed current in each of the wires of the two wire cable for providing DC power to the telephone set when the receiver is off the hook and for producing a sufficiently high DC voltage on the two wire cable to cause the output of said differential optical coupling amplifier means to undergo a transition to a limiting voltage in response to an open circuit presented by the telephone set to the two wire cable when the receiver is on the hook or during dialing; and (c) means for producing a status signal in response to the transition to the limiting voltage level.

19. A method for operating an interface circuit for coupling a two wire cable from a telephone set to an electronic switching system to reduce echo return, the method comprising the setps of:

(a) producing a first AC signal on the two wire cable in response to a first signal transmitted to the interface circuit by the electronic switching system;

(b) introducing a DC feed current in the two wire cable, thereby producing a DC voltage on the two wire cable proportional to cable resistance;

(c) conducting the microphone signal from the telephone set to the interface circuit on the two wire cable;

(d) producing a cancellation signal and proportional in magnitude to the DC voltage;

(e) subtracting the cancellation signal from the first AC signal, and the microphone signal, thereby cancelling the first AC signal out of the total voltage produced to obtain an output signal which includes the microphone signal but is substantially free of any components due to the first signal; and (f) transmitting the output signal to the electronic switching system.

20. A method of operating an interface circuit for coupling the two wire conductor from a telephone set to an electronic switching system, the interface circuit including a ground supply voltage conductor and a negative supply voltage conductor, a differential optical coupler including a first amplifier, a light emitting diode responsive to the first amplifier, a photodiode responsive to the light emitting diode, and a pair of current sources responsive to the photodiode and connected to the two wires of the two wire cable, the method comprising the steps of:

(a) charging one wire of the two wire cable to approximately the ground voltage and the other wire to approximately the negative supply voltage by means of the two current sources in response to the open circuit condition presented to the two wire cable when the receiver of the telephone set is on the hook;

(b) driving the output of the first amplifier to a limiting voltage thereof in response to the large voltage difference produced on the two wire cable by the charging step;

(c) increasing the current through the light emitting diode and the photodiode sufficiently to drive the output of the second amplifier to a limiting voltage in response to the limiting voltage at the output of the first amplifier; and (d) detecting the limiting voltage of the second amplifier in producing an output status signal representative of the status of the telephone receiver.

21. A method of operating an interface circuit for coupling a two wire cable from a telephone set to an electronic switching system, the interface circuit including a ring input, a differential optical coupling circuit including a first amplifier, a light emitting diode responsive to the first amplifier, a photodiode responsive to the light emitting diode, and a pair of current sources responsive to the photodiode current respectively coupled to the two wires of the two wire cable, the method comprising the steps of:

(a) applying a ring command signal to the ring input;

(b) changing the input voltage of the first amplifier to a level sufficient to turn off the light emitting diode to an extent sufficient to turn off the photodiode and the two current sources in response to the ring command signal, whereby the two current sources present a high impedance to the two wire cable; and (c) producing an output current sufficient in magnitude to activate the ring insertion circuit for the telephone set in response to the turning off of the photodiode.

* * * * *